United States Patent Office.

CAROLINA GOESSLING, OF JERSEY CITY, NEW JERSEY.

Letters Patent No. 80,620, dated August 4, 1868.

---

IMPROVED WATER AND DAMP-PROOF PAPER FOR COVERING WALLS.

---

The Schedule referred to in these Letters Patent and making part of the same.

---

TO ALL WHOM IT MAY CONCERN:

Be it known that I, CAROLINA W. GOESSLING, of Jersey City, in the county of Hudson, and State of New Jersey, have invented a new and improved Method of Preparing Paper to Prevent Dampness or Moisture in Houses; and I do hereby declare that the following is a full and exact description thereof.

The nature of my invention consists in the employment or use of common paper, which I saturate or coat with a composition prepared from various ingredients, in such a manner as to render it impervious to water, dampness, or moisture.

The said paper, after being prepared after the manner of my invention, may be secured to the walls or floor upon the inside of a house by means of small tacks made of zinc, copper, or other metal that is not liable to oxidate. This paper is perfectly impervious to water or dampness when properly secured to the inside walls of a house which are subject to dampness.

It is a fact well known that basements in most houses are very damp and unhealthy, also very injurious to furniture, especially in this city, (Jersey City,) where it is almost impossible to keep the paper from becoming mildewed and peeling off in the basements of houses, in consequence of moisture percolating through the walls.

By my invention, I am able to obviate and overcome all difficulties of basement-houses, by making them dry and healthy.

By my invention, I am also enabled to prevent mice, roaches, crickets, and other troublesome and obnoxious vermin and insects from cutting through the walls, which has heretofore been a great annoyance.

To enable others skilled in the art to make and use my invention, I will proceed to describe the process of manufacture and use.

For a given quantity of the material or composition with which I prepare the paper, I take, of the following ingredients—

Four and a quarter pounds common rosin, three pounds suet, a quarter pound yellow wax, and one-eighth pound flour of sulphur.

I put all of the above ingredients into an iron kettle, or other suitable vessel, and melt them together. When all of the ingredients are melted and thoroughly incorporated, and while warm, I take any common paper, and with a suitable brush, or other means, give the surface of the paper a thorough coating. Then, while the composition upon the paper is still in a plastic state, I lay the two surfaces of the paper, thus coated, together, so that when the composition is dry, the two thicknesses of the paper are cemented firmly together. I then give the two outer surfaces a thorough coating of the composition, which, when dry, becomes very hard, and perfectly impervious to dampness or moisture, when it is ready for use.

In securing the paper, thus prepared, to the walls, I employ small tack-nails, made from zinc, copper, or other metal that will not oxidate, or it may be secured by other suitable means.

The outer coatings may be colored with any of the well-known colors, to suit the taste of the manufacturer or consumer.

After the paper thus prepared has been properly secured to the walls, it entirely prevents any dampness or moisture which permeates the outer walls of the house to enter the rooms thereof.

My invention is a great desideratum, for the reason that it can be made with little trouble and very cheap, and a perfect preventive to dampness in rooms, which is so injurious to health, as many can attest in this city, where its utility and merit have been thoroughly tested.

It will be observed that after the prepared paper has been secured to the walls in a proper manner, it may be covered with any ornamental paper in the ordinary way.

Having thus described my invention, what I claim as new, and desire to secure by Letters Patent of the United States, is—

As an article of manufacture, paper, prepared substantially as described, and for the purposes herein set forth.

CAROLINA GOESSLING.

Witnesses:
C. ROGERS,
W. C. LOCKE.